(12) United States Patent
Sawdon

(10) Patent No.: US 6,640,458 B2
(45) Date of Patent: Nov. 4, 2003

(54) END ARM EFFECTOR SET-UP

(75) Inventor: Stephen E. Sawdon, Marysville, MI (US)

(73) Assignee: BTM Corporation, Marysville, MI (US)

( * ) Notice: Subject to any disclaimer, the term of this patent is extended or adjusted under 35 U.S.C. 154(b) by 65 days.

(21) Appl. No.: 10/105,869

(22) Filed: Mar. 25, 2002

(65) Prior Publication Data

US 2003/0177656 A1 Sep. 25, 2003

(51) Int. Cl.$^7$ ............................................. G05B 19/42
(52) U.S. Cl. ....................... 33/502; 901/568.14; 33/503; 33/533
(58) Field of Search .......................... 414/680; 901/50, 901/4, 568.14; 33/502, 503, 533, 645; 73/1.79

(56) References Cited

U.S. PATENT DOCUMENTS

| | | | |
|---|---|---|---|
| 2,404,456 A | * | 7/1946 | Pierce .......................... 33/645 |
| 4,041,649 A | * | 8/1977 | Stewart ........................ 33/645 |
| 4,161,068 A | * | 7/1979 | McMaster .................... 33/645 |
| 4,261,107 A | * | 4/1981 | Coleman et al. .............. 33/503 |
| 4,378,959 A | | 4/1983 | Susnjara |
| 4,481,592 A | | 11/1984 | Jacobs et al. |
| 4,549,276 A | | 10/1985 | Inaba et al. |
| 4,841,762 A | * | 6/1989 | Hunter ........................ 73/1.79 |
| 4,887,016 A | * | 12/1989 | Malick ........................ 700/254 |
| 5,218,550 A | * | 6/1993 | Kato ............................ 33/503 |
| 5,442,269 A | | 8/1995 | Takayama et al. |
| 5,625,957 A | * | 5/1997 | Breyer et al. .................. 33/503 |
| 5,740,081 A | | 4/1998 | Suzuki |
| 5,768,768 A | | 6/1998 | Best |
| 5,920,999 A | * | 7/1999 | Hutter ......................... 33/533 |
| 6,070,109 A | * | 5/2000 | McGee et al. ............... 73/1.79 |
| 6,124,693 A | | 9/2000 | Okanda et al. |
| RE36,929 E | | 10/2000 | Takayama et al. |
| 6,192,298 B1 | | 2/2001 | Nishikawa |
| 6,205,839 B1 | * | 3/2001 | Broganrdh et al. .......... 73/1.79 |
| 6,243,621 B1 | | 6/2001 | Tao et al. |
| 6,578,280 B2 | * | 6/2003 | Kinoshita et al. ............. 33/533 |

* cited by examiner

*Primary Examiner*—Diego Gutierrez
*Assistant Examiner*—Travis Reis
(74) *Attorney, Agent, or Firm*—Harness, Dickey & Pierce, P.L.C.

(57) ABSTRACT

An adjustable end arm effector alignment system and process is provided. The system includes an arm having a working end and an alignment support in a known location relative to said arm. An adjustable end arm effector including at least two alignment members is attached to one of said working end of said arm and said alignment support. A control system is also provided that is operable to move the working end of the arm into a first and a second alignment position, each permitting appropriate adjustment of the adjustable end arm effector with respect thereto.

21 Claims, 11 Drawing Sheets

END ARM EFFECTOR SET-UP

BACKGROUND AND SUMMARY OF THE INVENTION

This invention relates generally to adjustable end arm effectors usable with industrial robots; and more specifically, to the set-up of such an adjustable end arm effector.

In general, industrial robots include an articulated arm which is controlled by programming. The articulated arm typically ends in a support which is used to attach an end arm thereto which holds a workpiece interfacing tool. As used herein, the end arm, including any base used to attach the end arm to the articulated arm, and the tool are referred to, collectively, as an "end arm effector."

End arm effectors can include adjustable elements. For example, a workpiece interfacing tool may be attached to an end arm in utilizing an adjustment mechanism such that the rotation, angle and/or location of the tool with respect to an arm may be modified. Less commonly, the rotation, angle and/or length of a particular end arm may be adjustable relative to its base or attachment point to the articulated arm.

Examples of adjustable end arm effectors are disclosed in the following U.S. Pat. Nos.: 5,383,738 entitled "Ball Jointed Links" which issued to Herbermann on Jan. 24, 1995; 5,135,276 entitled "Transfer Boom" which issued to Blatt et al. on Aug. 4, 1992; and U.S. Pat. No. 5,071,309 entitled "Mounting Arrangement for a Multi-Function Arm" which issued to Herbermann on Dec. 10, 1991 all hereby incorporated herein by reference.

Utilizing adjustable end arm effectors can offer significant advantages. For example, the need to fabricate an end arm effector for each specific application is eliminated. Instead the components from an adjustable end arm effector can simply be readjusted for use in another application. This can save considerable time and money in comparison to the traditional fixed end arm effector manufacturing process.

Appropriate adjustments must be made during a set-up process to utilize adjustable end arm effectors. This may be done, for example, initially or after an industrial robot crash which impacts the adjustments. For example, coordinated transfer mechanisms which have miss-sequenced have been known to crash end arm effectors. In one known set-up process, a master workpiece is located on the load or unload fixture. The industrial robot is located in the work position with respect to the workpiece. Then, appropriate adjustments are made to the various end arm effectors that interact with the workpiece. One disadvantage of this set-up process is the requirement that when multiple adjustable arm end arm effectors are utilized, all of the arms are adjusted at one time while the robot remains in one position. Another disadvantage is the amount of space that can be required and the difficulty storing and managing the master workpiece part; particularly when the workpieces are large sheet metal components. Another disadvantage associated with this known set-up process is that the parts are often located with respect to the master workpiece based on visual inspection, rather than utilizing tactile feedback which can provide more accurate positioning.

In accordance with the present invention an adjustable end arm effector alignment system is provided. The system includes an arm having a working end and an alignment support in a known location relative to the arm. Also included is an adjustable end arm effector attached to one of the working end of the arm and the alignment support. In one aspect, the adjustable end arm effector includes at least two alignment members. The system additionally includes at least one cooperating alignment member attached to the other of the working end of the arm and the alignment support. The at least one cooperating alignment member is adapted to cooperate with the at least two alignment members. In another aspect, the cooperating alignment member includes a feature other than the workpiece interfacing feature of the workpiece interfacing tool that is adapted to cooperate with the alignment member. In yet another aspect of the present invention, a cooperating alignment member is included that has a cooperating mechanical alignment feature in a known location relative to the adjustable end arm effector. The mechanical alignment feature and the cooperating mechanical alignment features are adapted to provide mechanically cooperating engagement which, when cooperatively engaged, operates to accurately locate the first alignment member in a specific aligned position when the adjustable end arm effector is appropriately adjusted with respect thereto. An additional aspect includes a control system that is operable to move the working end of the arm into one or more alignment positions where one of the at least two alignment members cooperates with the at least one cooperating alignment member to identify when the adjustable end arm effector is appropriately adjusted with respect thereto.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For example, although the invention is described throughout with respect to an industrial robot, any controlled manipulation may be utilized, including manual manipulation to various predefined positions.

Figure 1:
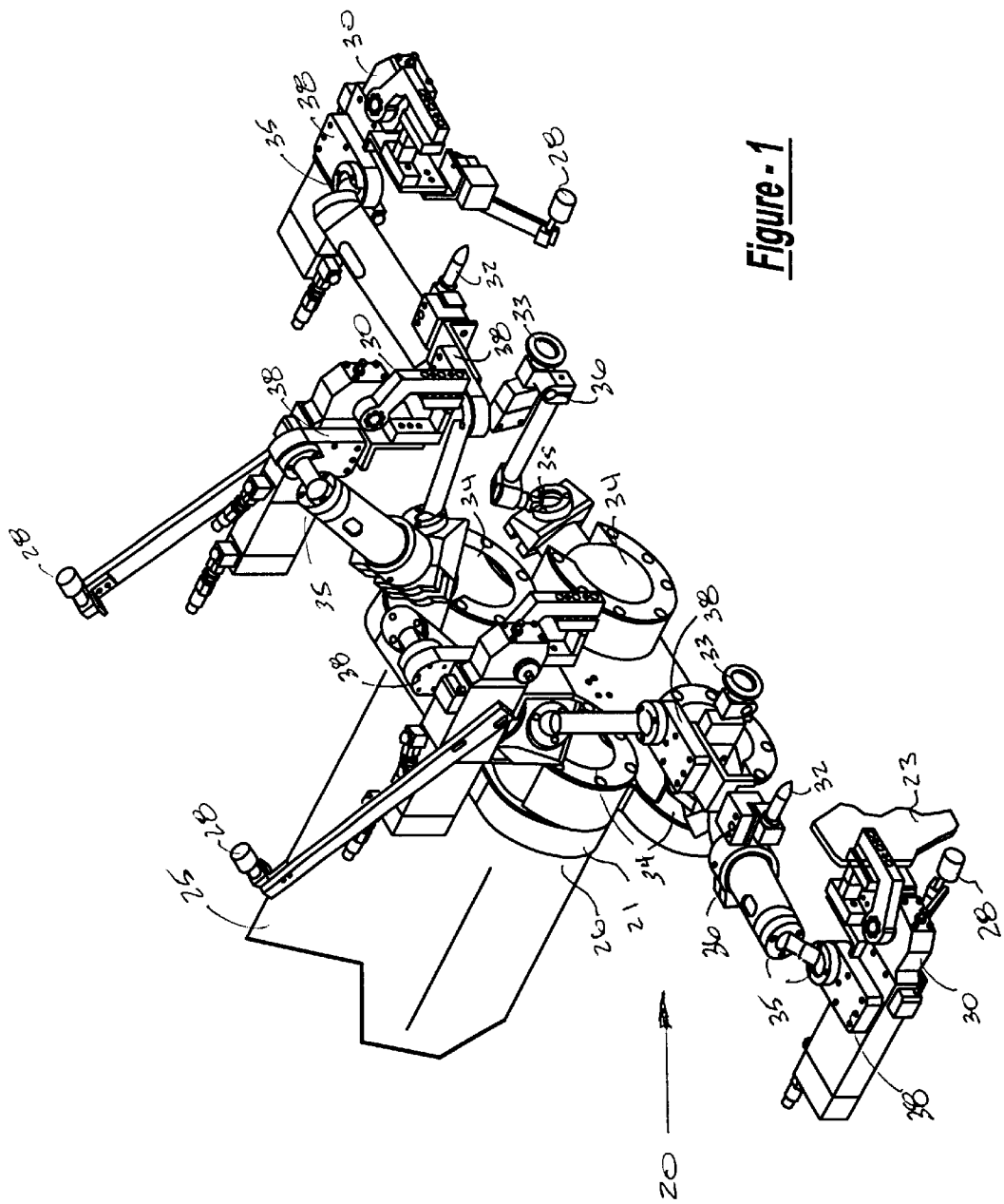
FIG. 1 is a perspective view showing adjustable end arm effectors which may be set up in accordance with the present invention.

Referring to FIG. 1, an adjustable end arm effector, indicated generally as 20, is used to retain or transport a workpiece 23, such as a stamped steel, body side frame of an automotive vehicle, within a manufacturing plant. An articulated robotic arm 25 is centrally bolted at its working end 26 to the base 21 of the adjustable end arm effector 20 for moving the effector 20 and selectively engaged workpiece 23 to various positions in the factory.

This particular adjustable end arm effector 20 is relatively complicated in that it includes a large number of various workpiece interfacing tools. For example, it includes bumpers 28, pneumatic grippers 30, pin position locators 32 and suction pick-ups 33 as workpiece interfacing tools. Each of these components are attached to one of four adjustable arms. Each arm is adjustably held by a ball joint clamp 34 as discussed more fully hereinafter with respect to FIG. 10. The arms also include various additional ball joint clamps 35 and additional clamping mechanisms 36 which offer additional adjustability.

The more complex two upper arms each include three attachment supports 38 which are used to attach the essentially non-adjustable workpiece interfacing tools 28, 30, 32, 33 thereto. Since the workpiece interfacing tools are essentially non-adjustably mounted to these attachment supports 38, by locating the attachment supports 38 appropriately, the tools attached to the attachment supports 38 will likewise be appropriately adjusted and located when it is attached thereto. Alternatively, of course, any necessary adjustments to a removable workpiece interfacing tool that is adjustable can be made separately.

Thus, in this first embodiment, the set-up process starts with providing these attachment supports 38 free of their workpiece interfacing tools. This may be done, for example by simply removing any attached tools from these attachment supports 38. As will become apparent from the discussion below, these attachment supports operate as alignment members.

Figure 2:
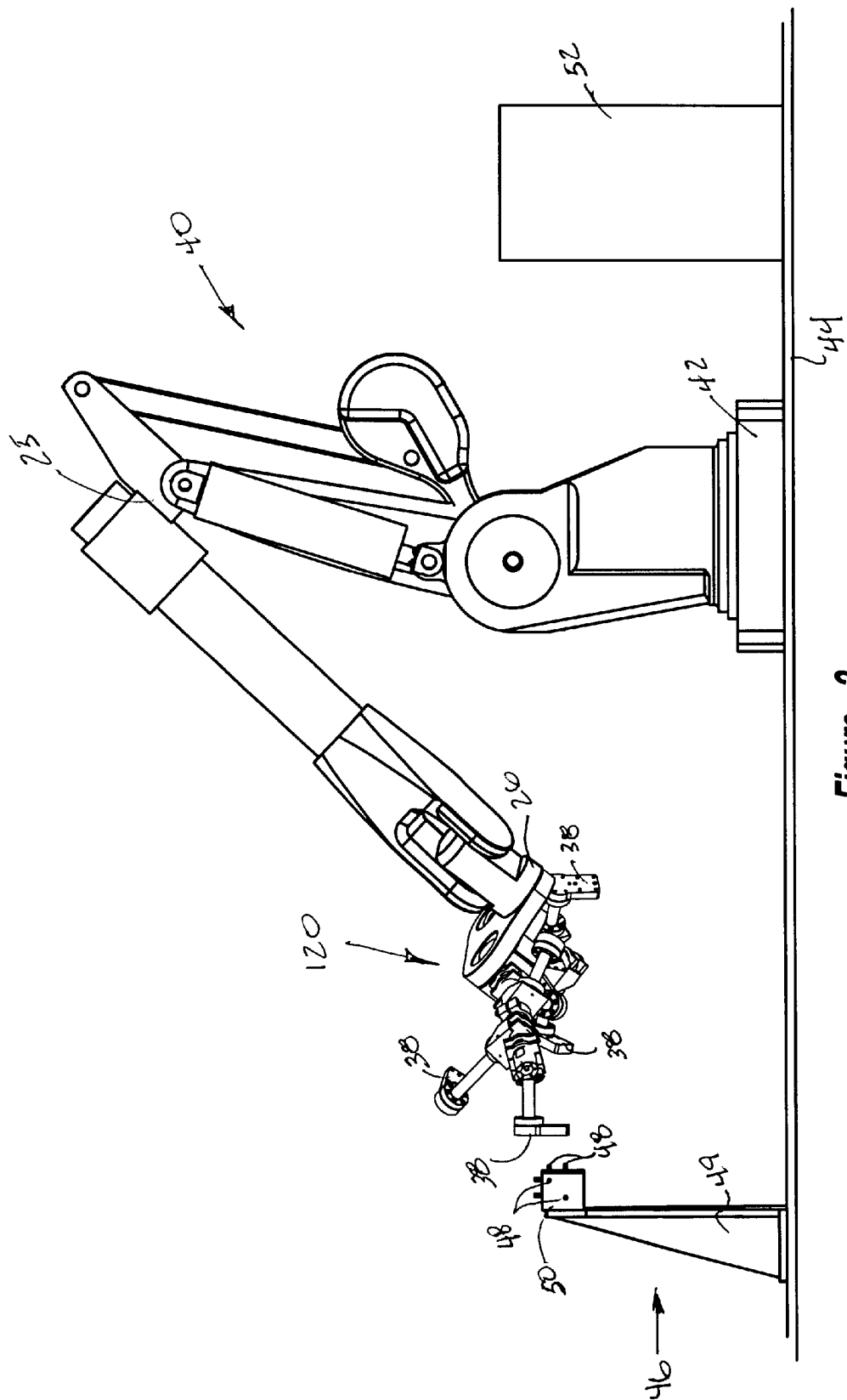
FIG. 2 is a side elevational view of an industrial robot with end arm effector during a preferred set up process.

Referring to FIG. 2, the alignment of the upper two arms of this embodiment will be further described with reference to the illustrated two arm end arm effector, indicated generally as 120 therein. Each arm includes multiple attachment supports 38 free of their workpiece interfacing tools so they can operate as alignment members. This view is somewhat similar to the upper arms of the adjustable end arm effector 20 of FIG. 1, with the workpiece interfacing tools removed from the attachment supports 38.

This two arm end arm effector 120 is mounted onto the working end 26 of an industrial robot 40. The industrial robot 40 includes an articulated arm 25. The articulated arm 25 is rotably attached to a pedestal 42 which is in turn attached to the floor 44. A cooperating alignment member 46, whose position relative to the industrial robot 40 is known, is also attached to the floor 44. The cooperating alignment member 46 includes a cooperating alignment support 49 holding a cube shaped element 50. On each of four faces of the cube 50, an alignment feature 48 of the cooperating alignment member 46 is located. Since the position of the cooperating alignment member 46 is known relative to the industrial robot 40, the position of each of the components of the cooperating alignment member 46 (including, for example, the alignment support 49, the cube 50, the alignment features 48, etc.) is known relative to each of the components of the industrial robot 40 (including, for example, the robot pedestal 42, the articulated arm 25, the working end of the arm 26, and the various alignment members 38 (when properly adjusted)).

In this embodiment, the cooperating alignment member 46 uses four sets of protrusions, one associated with each alignment feature 48, which cooperate with recesses on the alignment member 38, to provide cooperating mechanical engagement which enable accurate alignment of the desired components together. Each alignment feature 48, or set of protrusions, is located on one face of the cube 50. As illustrated, the cube 50 is relatively small in size. This enables the set up procedure to be accomplished within a relatively compact area versus the situation where a large master sheet metal workpiece is used for set-up. To minimize the space required, preferably each alignment feature 48 on the alignment member 46 is housed within a one meter square cube space; more preferably within a one-half meter cube space; even more preferably, within a one-third meter cube space.

The robot 40 includes a control system 52. The control system 52 may include software and/or firmware which operates to control various existing mechanical control components operative to manipulate the industrial robot 40. The control system 50 may alternatively be provided by manual manipulation of the industrial robot 40 or of the end arm effector 120 mounted to a manual set-up device instead of to the robot. As yet another alternative, the control system 52 may include the manual entry of set-up positioning data via a control input device (not shown) which may be provided to cooperate with existing components of the industrial robot control system 52.

Figure 3:
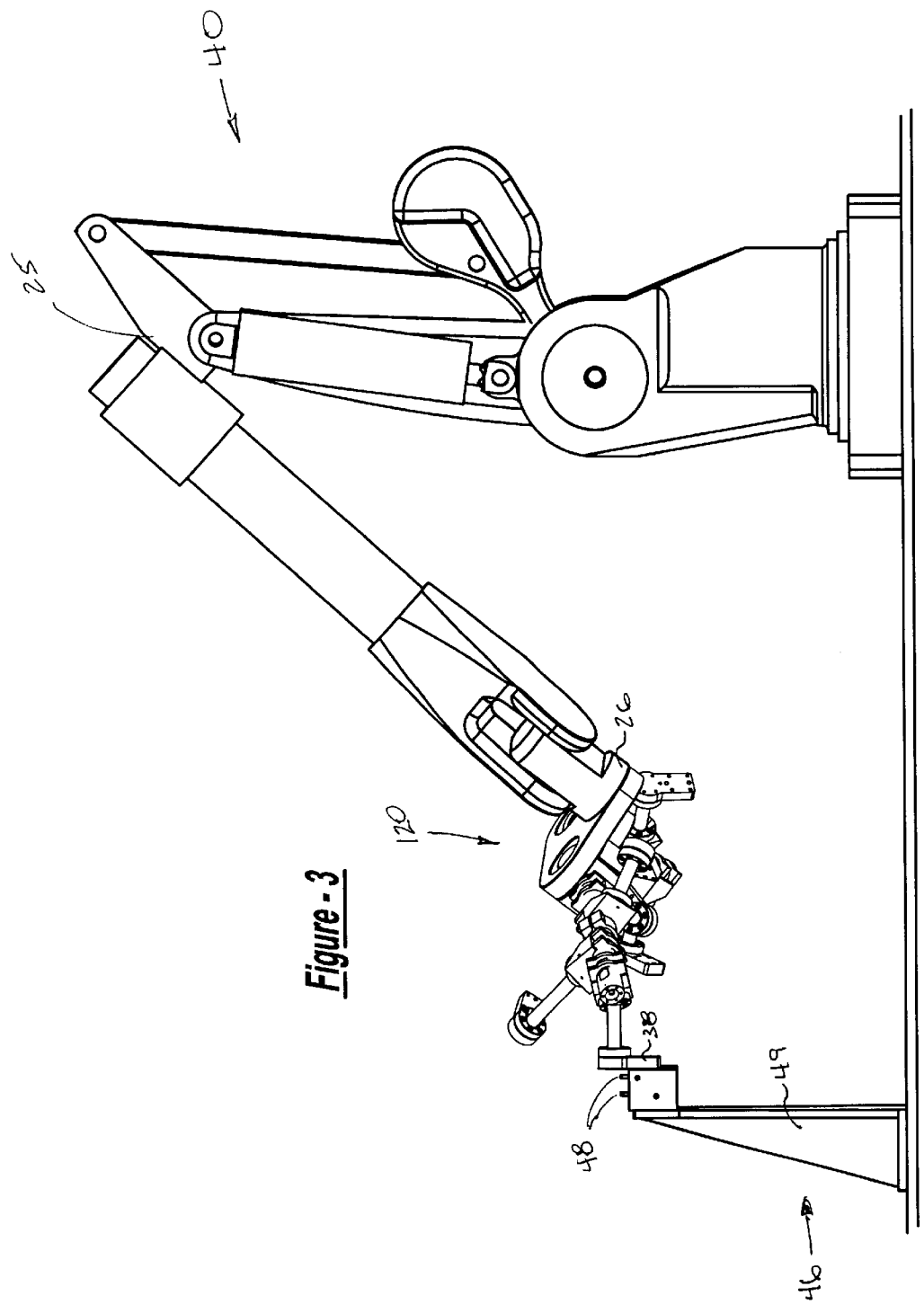
FIG. 3 is a side elevational view similar to FIG. 2, illustrating the industrial robot of FIG. 2 in a first set-up position at a later point in time.

Referring to FIG. 3, the end arm effector 120 has been moved into a first alignment position. In this case, this has been accomplished by using a control system 52 (seen in FIG. 2) associated with the articulated arm 25 of the industrial robot 40. The end arm effector 120 is adjusted while the working end 26 of the robot 40 is located in this first alignment position. If this first alignment position is achieved, and the alignment protrusions 48 of the front face of the cube 50 of the alignment support 49 do not accurately align with the recesses of the appropriate cooperating alignment member 38. Thus, the end arm effector 120 is appropriately adjusted with respect thereto. In other words, those portions of the adjustable end arm effector 120 which are adjustable with respect to the cooperation of these particular alignment members are appropriately adjusted.

It may be desirable to initially loosen the adjustment mechanisms, to avoid the robot 40 along with the end arm effector 120 crashing into the alignment support 49; particularly if significant misalignment is involved or an initial set-up is being performed. In addition or alternatively, the control 52 may include a step function where the industrial robot 40 is slowly stepped into position in response to manual input by an operator, insuring a crash does not result.

Figure 4:
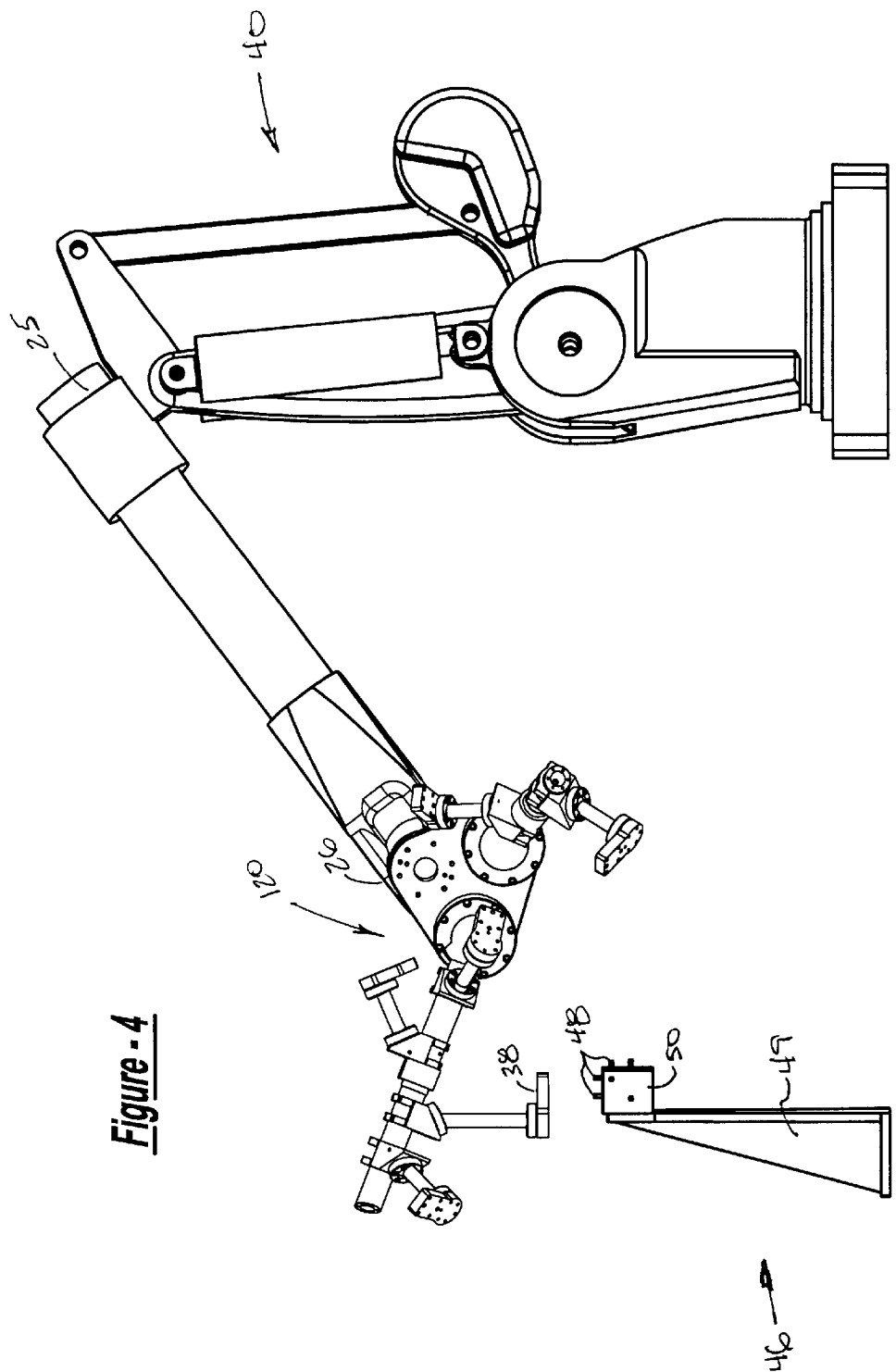
FIG. 4 is a side elevational view similar to FIG. 3, illustrating the industrial robot of FIG. 2 at a later point in time.

Referring to FIG. 4, the end arm effector 120 is illustrated in the process of being moved by the working end 26 of the articulated arm 25 of the industrial robot 40 into a second alignment position. This second alignment position is used to align the recesses of a subsequently selected cooperating alignment member 38 with a selected corresponding set of protrusions 48 on a second face of the cube 50 of the alignment member 46.

Figure 5:
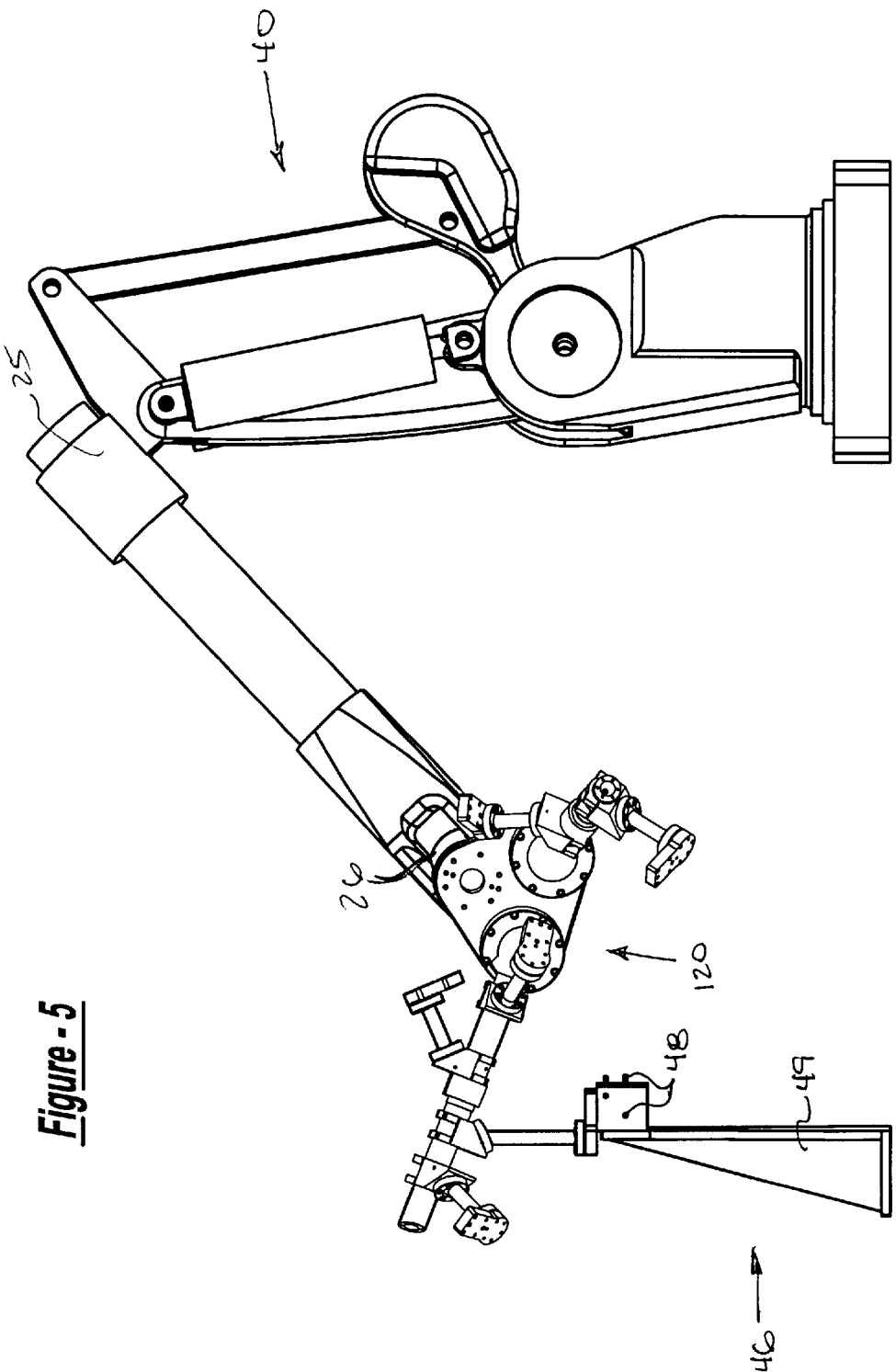
FIG. 5 is a side elevational view similar to FIG. 4, illustrating the industrial robot of FIG. 2, in a second set-up position at a later point in time.

Referring to FIG. 5, the end arm effector 120 is illustrated in a second alignment position of the working end 26 of the robot 40. The working end 26 of the robot 40 is moved by a control system 52 into a second known position relative to the cooperating alignment member 46, similar to the discussion above with respect to FIG. 3. Any adjustment that is necessary to the end arm effector 120 to locate the corresponding alignment member 38 in its appropriate cooperating relationship to the cooperating alignment member 46 is performed.

This process is repeated until all of the alignment members 38 have been appropriately gauged and adjusted, if necessary, with respect to its corresponding cooperating alignment member 46. One or more of the sets of protrusions 48 on the cooperating alignment member 46 may be utilized with multiple alignment members 38. Alternatively, all of the alignment members 38 may align with a single specific set-up location on the cooperating alignment member 46. As another alternative, different types of alignment features may be used with one or more of the alignment members 38.

Various other modifications to this embodiment are also possible. For example, after the adjustments have been made, a check of each alignment may be performed by moving a previously aligned alignment member 38 into a subsequent specific location on the cooperating alignment member 46. The alignment support 49 could include a portion of the floor or a wall. Also, the protrusions and the cooperating recesses could alternatively be reversed with respect to the alignment members 38 and 46. Additionally, alternative alignment features 48 from the illustrated protrusions and recesses could be provided, including conically or spherically shaped protrusions and recesses or any other interfitting surface profiles.

All of the above described preferred alignment features utilize mechanically cooperating elements which when cooperatively engaged, operate to accurately locate the alignment member 38 in a specific aligned position. This means that the alignment members 38 can be appropriately located with respect to each other based upon the tactile feel of the cooperating mechanical engagement. This cooperating mechanical engagement provides tactile feedback regarding whether the parts are correctly aligned with respect to each other, rather than relying upon visually locating the parts in association with mere indicia which lacks the tactile feedback.

Although mechanically cooperating alignment elements are preferred, non-mechanically cooperating alignment features may be used in set-up processes for some aspects of the present invention. For example, even simple markings on the cooperating alignment member 38 and/or the alignment member 46 may be utilized as the alignment feature to minimize the possibility of a crash during set-up.

Figure 6:
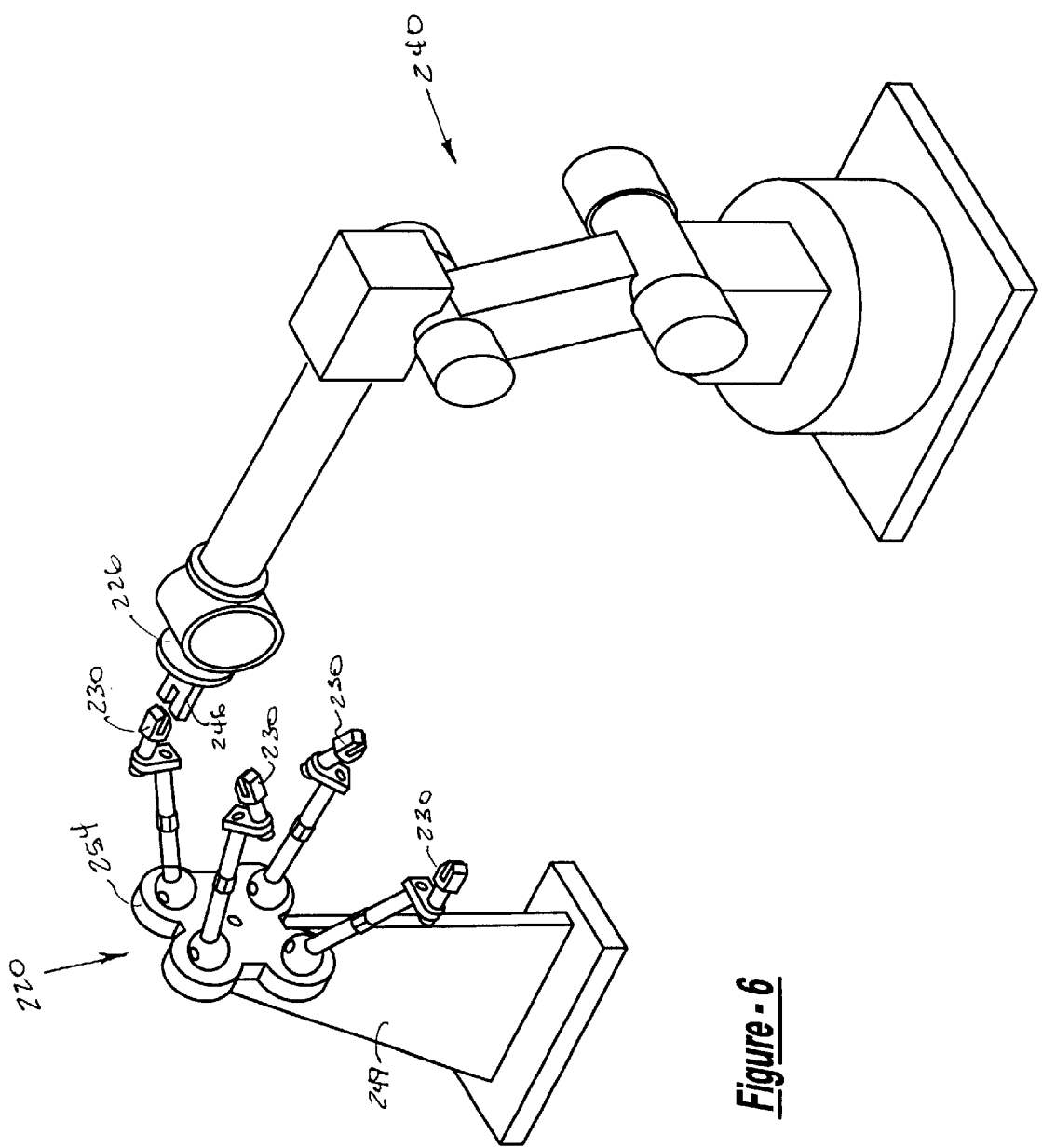
FIG. 6 is a side elevational view of an industrial robot cooperating with an adjustable end arm effector during a second preferred set-up process.

Referring to FIG. 6, another preferred embodiment of the set-up system and process of the present invention is described with respect thereto. In this embodiment the end arm effector 220 is removed from the working end 226 of the industrial robot 240 and attached by its base 254 to the alignment support 249. As illustrated, each workpiece interfacing tool is a pneumatic gripper 230 which operates in this embodiment as the cooperating alignment member. An alignment member 246 is attached to the working end 226 of the industrial robot 240 using the attachment mechanism normally utilized to attach the base 254 of the adjustable end arm effector 220 thereto.

Figure 7:
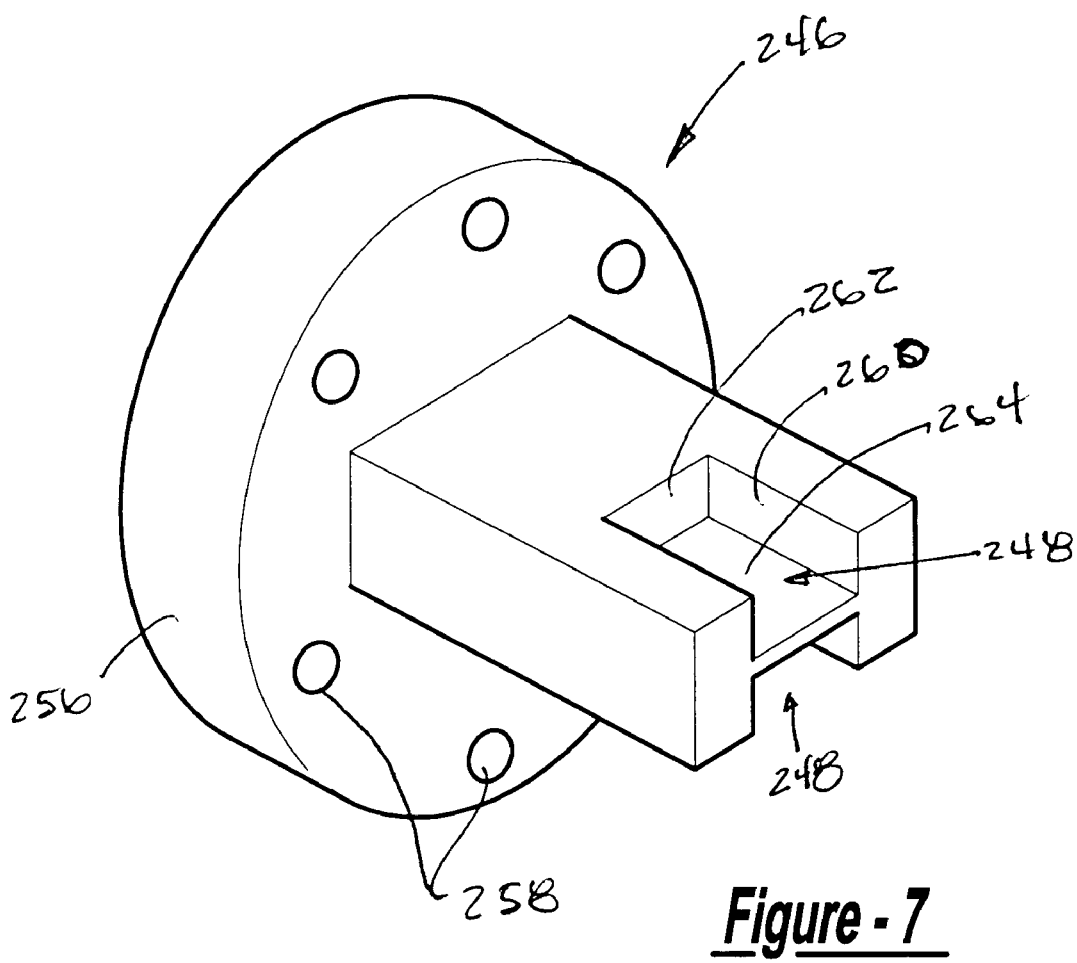
FIG. 7 is an enlarged perspective view of a gauge part which may be utilized in preferred set-up processes of the present invention.

Referring to FIG. 7, an enlarged perspective view of the cooperating alignment member 246 is illustrated. The cooperating alignment member 246 includes a base 256 with recesses 258, or apertures, which cooperate with threaded protrusions, or bolts (not shown) on the working end 226 of the industrial robot 240. The cooperating threaded protrusions and the series of apertures 258 may be unevenly spaced in an arrangement such that the cooperating alignment member 246 will only mate when it is placed in one specific angular orientation relative to the working end 226 of the robot 240.

Also included are two opposed channels 248 forming an "H"-shaped cross sectional area which provides an alignment element of the cooperating alignment member 246. The channels 248 include sidewall 260, endwalls 262 and bottom walls 264. Particularly where tight tolerances are required in set-up, these walls 260, 262, 264 are preferably sized such that they mate against corresponding elements of the alignment member 230.

The alignment members are the actual workpiece interfacing tools; in this case, pneumatic grippers 230. The size and shape of the channels 248 exactly matches the size and shape of the gripping portion of the gripper 230. For example, the side walls 260 are spaced apart exactly the same distance as the width of the gripping portions of the gripper 230. Thus, each pneumatic gripper has side edges and an end edge which mates directly against the corresponding sidewalls 260 and the endwall 262 of the cooperating alignment member 246, when appropriately aligned and the. industrial robot 240 is in the selected known position with respect to that gripper 230.

The gripper 230 preferably cooperates with the cooperating alignment member 246 to attach at a single specific location on the moveable component. For example, a back wall may additionally be provided so that the recess completely surrounds the gripping portions of the gripper 230 in close contact therewith. Thus, the gripper 230 may be attached to the cooperating alignment member 246 in a single specific location to insure the accuracy of the set-up process.

Returning to FIG. 6, the cooperating alignment member 246 is approaching a first alignment position with respect to a first gripper 230. Once the industrial robot 240 is in the first alignment position, any necessary adjustments are made to the arm of the end arm effector 220 associated with this first gripper 230 while the cooperating alignment member 246 is in this first alignment position. The process is subsequently repeated using subsequent alignment positions in relation to each gripper 230 and its associated arm of the end arm effector 220.

Various modifications may be made to this embodiment also. For example, the location of the end arm effector 220 and the cooperating alignment member 246 can be reversed in respect to the alignment support 249 and the working end 226 of the industrial robot 240. This is preferred to permit the utilization of the pneumatic control system of the industrial robot 240 for operating the gripper 230 during set-up, rather than requiring a second control system associated with the alignment support 249 or the use of manual actuation of the gripper 230.

Figure 8:
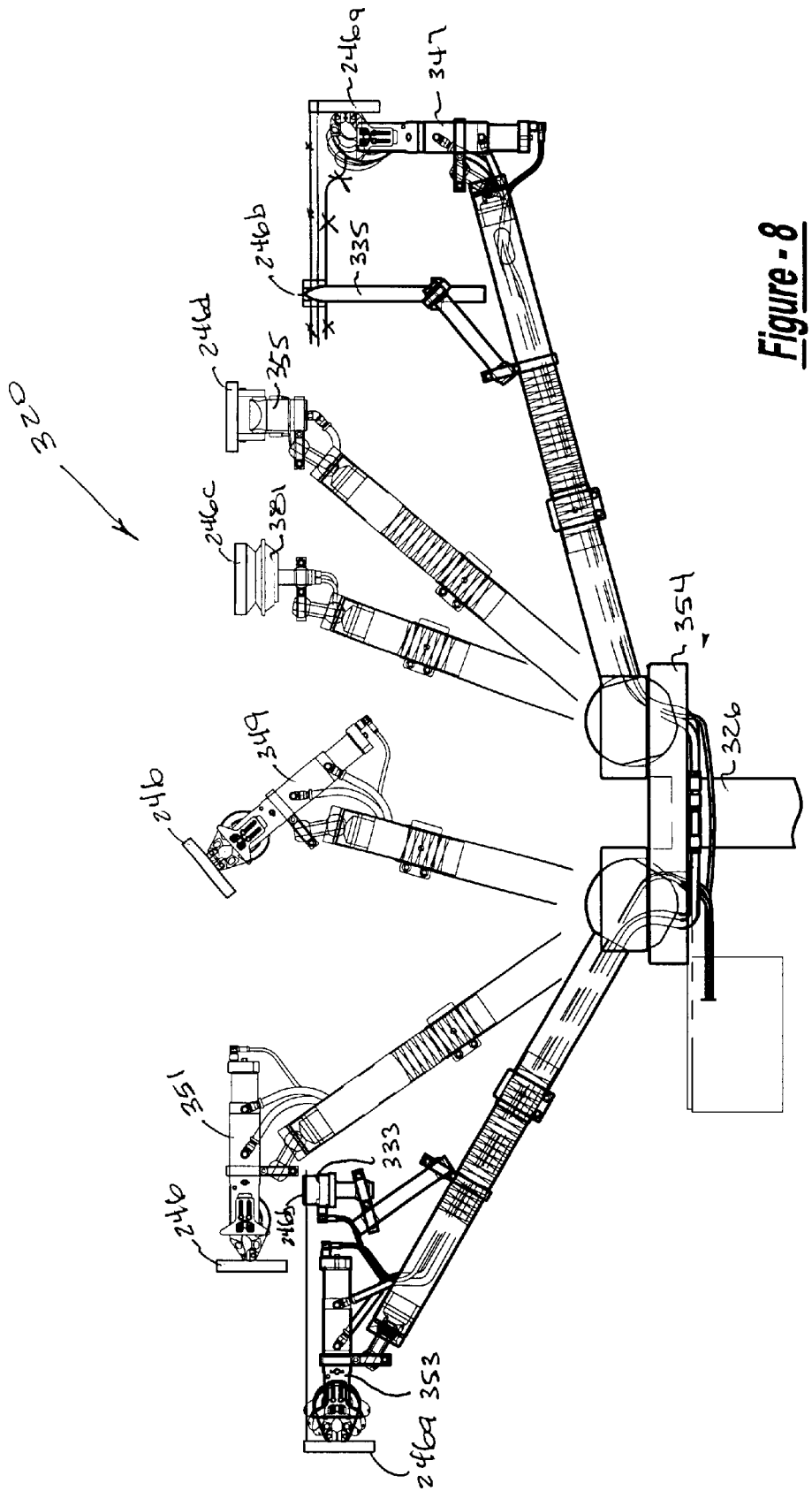
FIG. 8 is a side elevational view showing a preferred adjustable end arm effector in multiple positions and with multiple other preferred workpiece interfacing tools.

Referring to FIG. 8, yet another preferred system and process is described with respect thereto. Illustrated is an end arm effector 320 having various alternative workpiece interfacing tools in various locations on various arms of various lengths located on support plate 354 connected to working end 326. Each workpiece interfacing tool is illustrated associated with an alignment member. In this case, the alignment member 246 for each of two of the grippers 351, 349 is identical to the cooperating alignment member 246 of FIG. 7. A portion of the alignment member 246a associated with the remaining two grippers 347, 353 is likewise identical to that of FIG. 7. However, these alignment members 246a include an extension connected thereto which includes an additional alignment feature 246b or aperture to accommodate other workpiece interfacing tools 333, 335 also located on the same end arm. These include pin locator 335 located on the arm with gripper 347 and electromagnetic coil proximity part-present sensor 333 located on the arm with gripper 353.

In the case of the pin locator 335, the additional alignment feature 246b includes a recess bounded by a cylindrical wall and an end wall sized to exactly accommodate the pin locator 335. Thus, when the pin locator 335 is placed into the recess in contact with the side and end walls, the end arm effector 320 is appropriately aligned with respect to the pin locator 335. Similarly, the part-present sensor 333 of the arm associated with the gripper 353 includes a recess bounded by a cylindrical wall and an end wall. Likewise when the part-present sensor 333 is located into the recess in contact with the cylindrical side wall and the end wall, the end arm effector 320 is appropriately aligned with respect to the part-present sensor 333.

The extension 246b can be formed as a single integral part with the first alignment member 246a, or may be separately attached to the alignment member 246a. This attachment may alternatively be done after the gripper 347, 353 has first been aligned with the alignment member 246a. For example, the extension may be attached via the same apertures 258 (seen in FIG. 7) using protrusions similar to those on the cooperating alignment member as discussed hereinafter.

Suction pick-up 381 and part-present sensor 355 utilize alignment members 246c, 246d which are essentially the same as the base portion of the alignment member 246 of FIG. 7. For the suction pick-up 381, the alignment member 246c is located and held in place by the suction action. For the part-present sensor 355, alignment member 246d is simply snap-fit onto the part-present sensor 355. In either case, any necessary orientation can be provided by the attachment configuration or aligning marks on the relative components.

The alignment system and process is essentially identical to that previously described, for example, with respect to FIGS. 2 through 5. Rather than removing the workpiece interfacing tools to expose attachment supports 38 operating as alignment members as described therein, however, the alignment members are associated with the workpiece interfacing tools (in this case via attachment of the alignment members 246, 246a, 246b, 246c and 246d to the workpiece interfacing tools 349, 351, 333, 335, 347, 353, 355 and 381). As previously described each of the alignment members includes recesses which successively cooperate with one or more sets of protrusions located as part of a cooperating alignment member, similar to that seen in FIGS. 2 and 5.

With respect to the arms supporting workpiece interfacing tools 353 and 347, however, the additional step of aligning the part-present sensor 333 and the pin locator 335, respectively, with the alignment features 246b on the corresponding extensions is included. Although both workpiece interfacing tools of each arm (gripper 353 and part-present sensor 333 or gripper 347 and pin locator 335) may be aligned at the same time, in some cases it may be preferable to first make all of the adjustments associated with the arm necessary to appropriately align the gripper 347 or 353. Then, to subsequently align any additional workpiece interfacing tools, such as the part-present sensor 333 and pin locator 335 utilizing the alignment features 246b of the extension.

As indicated above, the extension of the alignment members 246a is integrally formed with the base. Alternatively, it may be attached to the alignment member 246a after the gripper 347 or 353 related adjustments have been made. In yet another alternative, the extension (or some other mechanism for providing the appropriate alignment feature) may instead be attached to the support member (or some other element) of the cooperating alignment feature. In the case where this second alignment feature attaches to the support member, the position of the working end of the robot utilized in the alignment step may be the same as that used for the other workpiece interfacing tool of the arm or a second alignment position specific to that tool might be utilized.

As described above, the alignment members 246, 246a, 246c, 246d may be attached to the workpiece interfacing tool in various removable ways. Of course, the alignment member may be integrally formed as a permanent part of the workpiece interfacing tool. In either case with this embodiment, the alignment member has an alignment feature which is other than the workpiece interfacing feature of the workpiece interfacing tool. Of course, as seen in other embodiments, it is alternatively possible to utilize the workpiece interfacing feature of the tool (or some other feature of the tool) as an alignment member.

Figure 9:
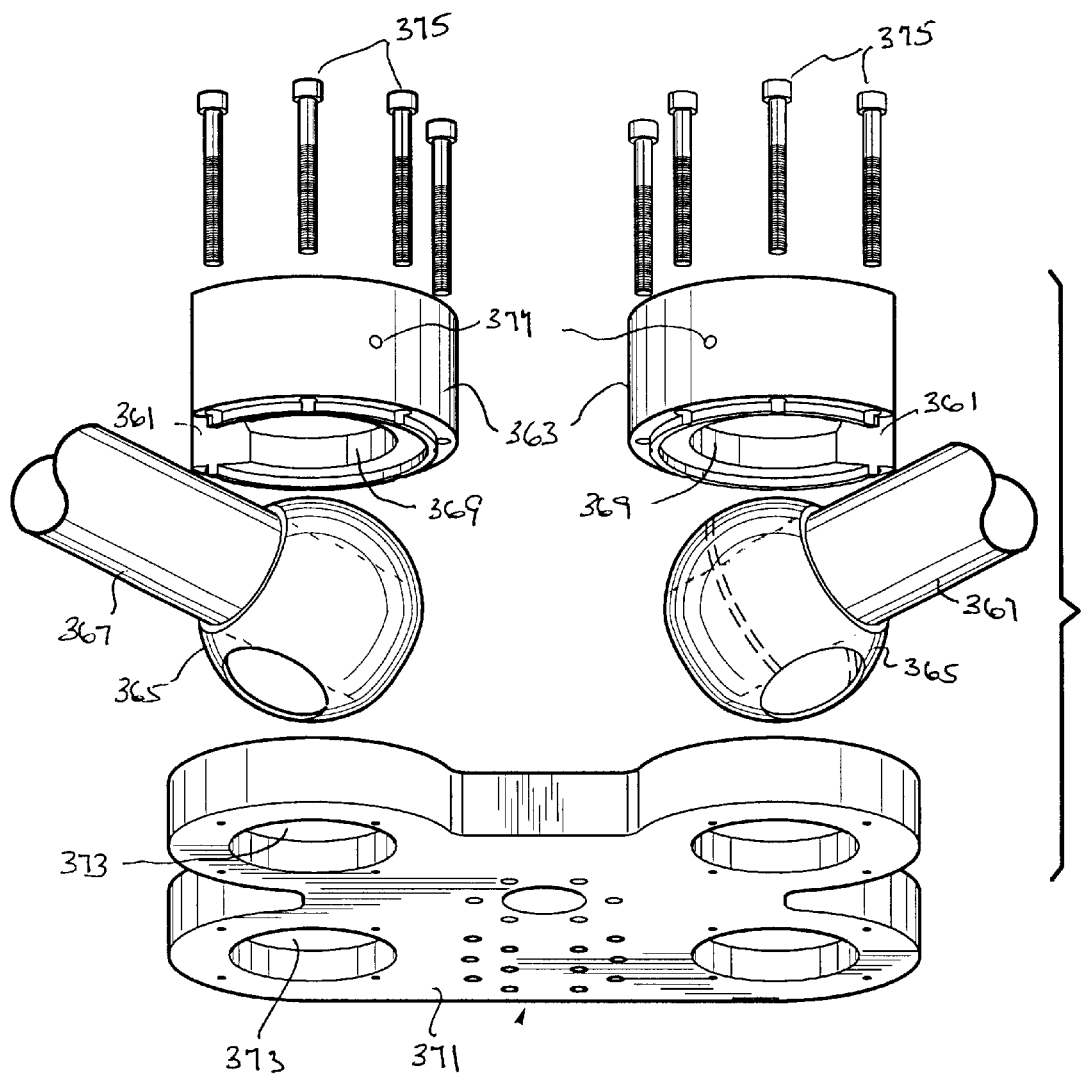
FIG. 9 is a fragmentary and exploded side elevational view showing a base, clamp rings, balls and arms of one preferred end arm effector adjustment mechanism.

Referring to FIG. 9, one preferred adjustment mechanism for rotably and angularly adjusting an arm of an adjustable end arm effector relative to its base (as seen in FIG. 8) is illustrated. Each clamp ring 363 is a C-shaped member having a side opening 361 and a top opening through which arm 367 and a portion of ball 365 extend, respectively. Each clamp ring 363 further has an internal partially spherical cavity 369 for receiving the respective ball 365. Each corner of base 371 also has a partially spherical cavity 373 for receiving a corresponding ball 365. Bolts 375 are employed to loosely secure each clamp ring 363 to base 371, whereupon the corresponding ball trapped therebetween is pivotally adjusted to a desired orientation. After such a desired set up orientation is achieved, bolts 375 are tightened so as to secure and maintain the respective ball 365 and arm 367 in the final setup position. It should be appreciated, however, that each clamp ring 363 can be unbolted from base 371 and rotated to many different rotational positions such that side opening 361 of each clamp ring 363 can be differently angled relative to base 371. Ball 365 is welded to arm 367 at both sides of the spherical ball 365. If necessary, a dowel or screw can be inserted into aperture 377 in each clamp ring 363 for supplementally securing the corresponding ball 365 in its ultimately desired position.

Figure 10:
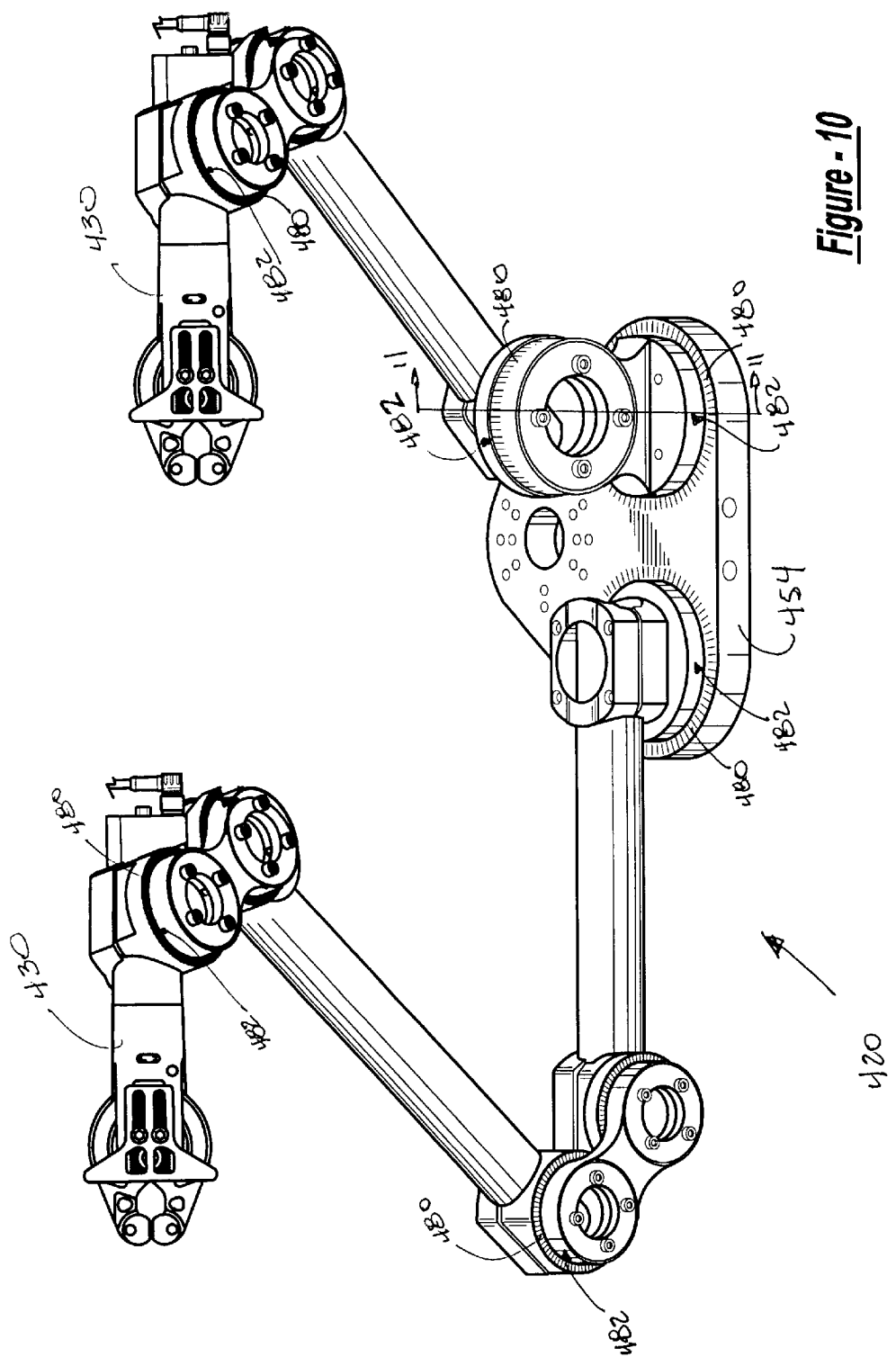
FIG. 10 is a perspective view of an alternative preferred adjustable end arm effector.
Figure 11:
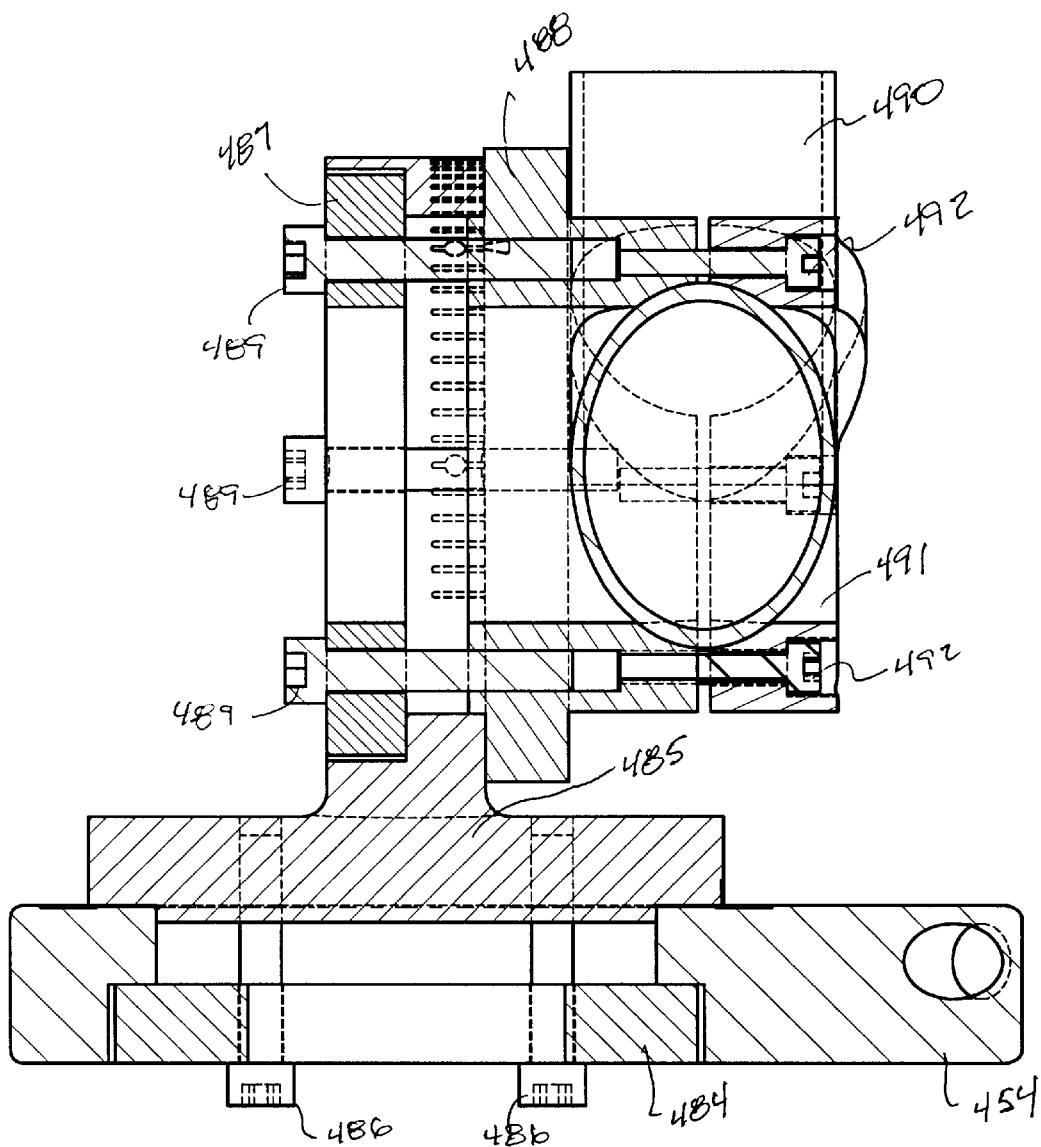
FIG. 11 is a cross sectional view taken along line 11—11 of FIG. 10.

Referring to FIGS. 10 and 11, another preferred adjustment mechanism for adjusting an arm of an adjustable end arm effector 420 with grippers 430 is illustrated. The joints include alignment indicia 480 and cooperating alignment indicia 482. As illustrated, the alignment indicia 480 is a series of marks indicating various angles located on a first joint member. The cooperating alignment indicia 482 is illustrated as a single cooperating alignment mark on a second cooperating joint member. The alignment indicia components 480, 482 may be utilized in the set-up operation to provide an initial rough set-up of the adjustable end arm effector 420 prior to moving the end arm effector 420 through the various alignment positions. Alternatively, the alignment indicia components 480, 482 are utilized to enable recording of the alignment positions for each joint after an initial set-up operation as discussed above, eliminating the necessity of subsequently needing to repeat the alignment process should a robot crash occur thereafter.

Referring specifically to FIG. 11, the compound joint at the right side of the support plate 454 is actually made up of three simple joints. As discussed below, each simple joint includes a central component which is compressed by two outer components providing frictional engagement. Thus, by tightening or loosening screws, the various joints can be selectively locked into desired positions. For example, with the first simple joint, the end arm effector base plate 454 is compressed between annular ring member 484 and perpendicular joint member 485 when screws 486 are tightened. With the second simple joint, the perpendicular joint member 485 is similarly compressed between a second annular ring member 487 and a rotary joint member 488 by tightening screws 489. For the third simple joint, a tubular member 490 is compressed between the rotary joint member 488 and a tubular clamp member 491 by tightening screws 492. In this way, the joints can be locked into various positions as desired.

While preferred embodiments of the end arm manipulator have been disclosed, it will be appreciated that various other embodiments may be employed without departing from the present invention. For example, the distal end ball and socket tool mounting arrangement can be employed independently of the rest of the invention. Furthermore, any number of ball, arm and clamp ring combinations can be employed with a single base. For example, it is envisioned that two, four and six arm to base combinations would be desirable for many factory applications. Moreover, hydraulic fluid, pneumatic fluid or electrically powered tools of any variety can be mounted to the present invention construction. For example, welding guns or riveting machines can be used. Various materials and fasteners have been disclosed in an exemplary fashion; however, other materials and fasteners may of course be employed. It is intended by the following claims to cover these and any other departures from the disclosed embodiments which fall within the true spirit of this invention. Furthermore, use of terms such as first or second herein, including the claims are simply utilized to distinguish between two commonly named features and do not input importance, positioning, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustable end arm effector alignment system comprising:
    an arm having a working end;
    an alignment support in a known location relative to said arm;
    an adjustable end arm effector attached to one of said working end of said arm and said alignment support, said adjustable end arm effector including at least two alignment members;
    at least one cooperating alignment member attached to the other of said working end of said arm and said alignment support, said at least one cooperating alignment member being adapted to cooperate with said at least two alignment members; and
    a control system operable to move said working end of said arm into a first alignment position where one of said at least two alignment members cooperates with said at least one cooperating alignment member to identify when said adjustable end arm effector is appropriately adjusted with respect thereto, and operable to subsequently move said working end into a second alignment position where another of said at least two alignment members cooperates with said at least one cooperating alignment member to identify when said adjustable end arm effector is appropriately adjusted with respect thereto.

2. An adjustable end arm effector alignment system according to claim 1, wherein the arm is an articulated arm of an industrial robot.

3. An adjustable end arm effector alignment system according to claim 1, wherein the at least one cooperating alignment member is at least two cooperating alignment members and wherein all of said cooperating members are attached to said alignment support and located within a space of about 1 cubic meter or less.

4. An adjustable end arm effector alignment system according to claim 1, wherein said at least two alignment members are workpiece interfacing tool supports.

5. An adjustable end arm effector alignment system according to claim 1, wherein said at least two alignment members are workpiece interfacing tools.

6. An adjustable end arm effector alignment system according to claim 5, wherein each of said at least two alignment members are attached to one of said workpiece interfacing tools.

7. An adjustable end arm effector alignment system according to claim 6, wherein said workpiece interfacing tools are at least two grippers having jaws and each of said at least two alignment members is held within said jaws of one of said grippers.

8. An adjustable end arm effector alignment system according to claim 1, wherein said at least two alignment members each member include a mechanical alignment feature and wherein said at least one cooperating alignment member includes a cooperating mechanical alignment feature adapted to provide mechanically cooperating engagement with said mechanical alignment feature.

9. An adjustable end arm effector alignment system comprising:
    an arm having a working end
    an alignment support in a known location relative to said arm;
    an adjustable end arm effector attached to one of said working end of said arm and said alignment support, the adjustable end arm effector including at least two workpiece interfacing tools each having a workpiece interfacing feature;
    an alignment member attached to the other of said working end of said arm and said alignment support; and
    a cooperating alignment member attached to at least one of said at least two workpiece interfacing tools, said cooperating alignment member including a feature other than the workpiece interfacing feature of the workpiece interfacing tool, said feature of said cooperating alignment member being adapted to cooperate with said alignment member, the cooperating alignment member being independently moveable relative to another of said at least two workpiece interfacing tools to enable said alignment member to cooperate with said cooperating alignment member to identify when said adjustable end arm effector is appropriately adjusted with respect thereto.

10. An adjustable end arm effector alignment system according to claim 9, wherein the arm is an articulated arm of an industrial robot.

11. An adjustable end arm effector alignment system according to claim 9, wherein the cooperating alignment member is a plurality of cooperating alignment members and wherein all of said plurality of cooperating members are attached to said alignment support and located within a space of about 1 cubic meter or less.

12. An adjustable end arm effector alignment system according to claim 9, wherein at least one of said at least two workpiece interfacing tools is a fluid powered gripper having jaws.

13. An adjustable end arm effector alignment system according to claim 12, wherein said cooperating alignment member is held within said jaws of said gripper.

14. An adjustable end arm effector alignment system according to claim 9, wherein said alignment member includes a mechanical alignment feature and wherein said cooperating alignment feature includes a cooperating mechanical alignment feature adapted to provide mechanically cooperating engagement with said mechanical alignment feature.

15. An adjustable end arm effector alignment system comprising:

two alignment members each with a mechanical alignment feature attached to said adjustable end arm effector; and a cooperating alignment member having a cooperating mechanical alignment feature in a known location relative to an adjustable end arm effector, said mechanical alignment features and said cooperating mechanical alignment feature being adapted to provide mechanically cooperating engagement which, when cooperatively engaged, operates to accurately locate the first alignment member in a specific aligned position when the adjustable end arm effector is appropriately adjusted with respect thereto.

16. An adjustable end arm effector alignment system according to claim 15, wherein at least one of said at least two said mechanical alignment features and said cooperating mechanical alignment feature includes a protrusion and the other of said mechanical alignment feature and said cooperating mechanical alignment feature includes a recess cooperating with said protrusion.

17. An adjustable end arm effector alignment system according to claim 15, wherein at least one of said at least two mechanical alignment features includes a gripper having jaws with side walls and an end wall and said cooperating alignment feature includes a channel having side walls and an end wall sized and shaped to contact against the side walls and end wall of said g ripper.

18. An adjustable end arm effector alignment system according to claim 15, wherein said cooperating alignment member is at least two cooperating alignment members and wherein all of said at least two cooperating alignment members are located within a space of about 1 cubic meter or less.

19. An adjustable end arm effector alignment system according to claim 15, wherein at least one of said at least two alignment members is a workpiece interfacing tool support.

20. An adjustable end arm effector alignment system according to claim 18, wherein at least one of said at least two alignment members is a workpiece interfacing tool.

21. An adjustable end arm effector alignment system according to claim 20, wherein at least one of said at least two mechanical alignment features is attached to said workpiece interfacing tool.

* * * * *

UNITED STATES PATENT AND TRADEMARK OFFICE
CERTIFICATE OF CORRECTION

PATENT NO. : 6,640,458 B2
DATED : November 4, 2003
INVENTOR(S) : Stephen E. Sawdon It is certified that error appears in the above-identified patent and that said Letters Patent is hereby corrected as shown below:

Title page,
Item [56], References Cited, U.S. PATENT DOCUMENTS, "6,205,839 B1  3/2001  Broganrdh et al." should be -- 6,205,839  B1  3/2001  Brogardh et al. --.

Column 1,
Line 43, "miss-sequenced" should be -- mis-sequenced --.
Line 50, after "adjustable" delete "arm".

Column 2,
Line 59, after "invention;" delete "and".

Column 4,
Line 49, after "achieved," delete "and".

Column 6,
Line 34, "the." should be -- the --.

Column 10,
Line 39, after "each" delete "member".

Column 12,
Line 17, "g ripper" should be -- gripper --.

Signed and Sealed this

Sixteenth Day of March, 2004

JON W. DUDAS
*Acting Director of the United States Patent and Trademark Office*